US009971929B2

(12) United States Patent
Phillips et al.

(10) Patent No.: US 9,971,929 B2
(45) Date of Patent: May 15, 2018

(54) FINGERPRINT CLASSIFICATION SYSTEM AND METHOD USING REGULAR EXPRESSION MACHINES

(71) Applicant: University of The West Indies, St. Augustine (TT)

(72) Inventors: Laurice Phillips, Chaguanas (TT); Margaret Bernard, St. Joseph (TT); Duc The Kieu, St. Augustine (TT)

(73) Assignee: University of The West Indies, St. Augustine (TT)

( * ) Notice: Subject to any disclaimer, the term of this patent is extended or adjusted under 35 U.S.C. 154(b) by 0 days. days.

(21) Appl. No.: 15/418,043

(22) Filed: Jan. 27, 2017

(65) Prior Publication Data

US 2017/0220836 A1    Aug. 3, 2017

Related U.S. Application Data

(60) Provisional application No. 62/288,035, filed on Jan. 28, 2016.

(51) Int. Cl.
| | |
|---|---|
| *G06K 9/00* | (2006.01) |
| *G06T 5/00* | (2006.01) |
| *G06T 7/73* | (2017.01) |
| *G06T 7/11* | (2017.01) |
| *G06K 9/52* | (2006.01) |
| *G06K 9/62* | (2006.01) |

(52) U.S. Cl.
CPC .......... *G06K 9/001* (2013.01); *G06K 9/0008* (2013.01); *G06K 9/52* (2013.01); *G06K 9/6256* (2013.01); *G06T 5/00* (2013.01); *G06T 7/11* (2017.01); *G06T 7/74* (2017.01)

(58) Field of Classification Search
CPC ........ G06K 9/0008; G06K 9/001; G06K 9/52; G06K 9/6256; G06T 5/00; G06T 7/11; G06T 7/74
See application file for complete search history.

(56) References Cited

U.S. PATENT DOCUMENTS

2003/0179909 A1* 9/2003 Wong ................. G06K 9/00026
382/115
2007/0036400 A1* 2/2007 Watanabe .............. G06K 9/001
382/124

* cited by examiner

*Primary Examiner* — Edward Park
(74) *Attorney, Agent, or Firm* — Wilmer Cutler Pickering Hale and Dorr LLP (57) ABSTRACT

A fingerprint classification system and method for extracting the dominant singularity from a fingerprint image are described. The fingerprint classification system and method receive as an input a digital fingerprint image and the image is preprocessed to generate an enhanced and more accurate image. Feature pattern calculations are performed on the updated image to generate an Orientation Feature Vector. The Orientation Feature Vector is processed using a Regular Expression Machine classifier prediction model to generate a class label for the digital fingerprint image that was input.

17 Claims, 9 Drawing Sheets

FINGERPRINT CLASSIFICATION SYSTEM AND METHOD USING REGULAR EXPRESSION MACHINES

RELATED APPLICATION

This application claims the benefit of U.S. Provisional Patent Application Ser. No. 62/288,035, titled FINGERPRINT CLASSIFICATION SYSTEM AND METHOD USING REGULAR EXPRESSION MACHINES AND A LMK CLASSIFIER MODEL, and filed on Jan. 28, 2016, which is incorporated by reference herein in its entirety for all purposes.

FIELD OF INVENTION

The present invention relates to the classification of a digital fingerprint image.

BACKGROUND

The present invention overcomes problems in conventional fingerprint classification systems to provide a more accurate system and method for fingerprint classification.

SUMMARY

According to various aspects, the present disclosure is directed at a fingerprint classification system and method using regular expressions. By using the presently disclosed techniques, the presently disclosed fingerprint classification system can operate faster and more efficiently (e.g., by using less memory, or requiring less processor-intensive calculations) than previously-known fingerprint classification systems, while also achieving high accuracy and reliability in classifying fingerprints into different classes.

According to one aspect, the present disclosure is directed at a system for classifying dominant singularity in a digital fingerprint image, the system comprising: an image enhancement unit configured to enhance the digital fingerprint image to generate an enhanced digital fingerprint image; a feature extraction and analysis unit configured to analyze image features within each of a predetermined number of local segments of the enhanced digital fingerprint image to translate the image features into orientations that estimate dominant structures in the underlying enhanced digital fingerprint image; a major block segmentation unit configured to determine, for each of a predetermined number of major blocks in the enhanced digital fingerprint image, a dominant orientation of ridge and valley patterns in the enhanced digital fingerprint image, wherein each major block comprises multiple local segments; a feature orientation calculation and extraction unit configured to generate an Orientation Feature Vector by listing, according to a predetermined sequence, the dominant orientations of each of the major blocks of the enhanced digital fingerprint image; at least one memory storing a bank of regular expressions corresponding to a class of fingerprint images, wherein each regular expression describes sequences of dominant orientations associated with previous Orientation Feature Vectors generated from digital fingerprint images belonging to the class of fingerprint images; and a regular expression matching unit configured to determine whether the digital fingerprint image belongs to the class of fingerprint images by determining whether any of the regular expressions in the bank of regular expressions match the Orientation Feature Vector generated by the feature orientation calculation and extraction unit.

In some embodiments, the image enhancement unit further includes an image filter subunit configured to apply a digital filter to the digital fingerprint image to decrease noise in the digital fingerprint image.

In some embodiments, the image enhancement unit further includes a segmentation subunit configured to segment the digital fingerprint image into multiple equally sized regions, and an image normalization subunit for increasing contrast of ridge/valley pixel intensities within each equally sized region.

In some embodiments, the image enhancement unit further includes a binary image extracting subunit configured to extract a binary image from the digital fingerprint image by classifying pixels of the digital fingerprint image as ridge pixels or valley pixels.

In some embodiments, the image enhancement unit further includes an erosion subunit configured to convolve a structure element with the digital fingerprint image.

In some embodiments, the image enhancement unit further includes a gradient field subunit configured to generate gradient vectors based on directions of underlying features in the digital fingerprint image.

In some embodiments, the system further comprises a training management unit configured to: receive a training digital fingerprint image that belongs to the class of fingerprint images; generate a training Orientation Feature Vector from the training digital fingerprint image; determine a regular expression in the bank of regular expressions that matches with the training Orientation Feature Vector; and promote the matching regular expression to a higher priority in the bank of regular expressions.

In some embodiments, the class of fingerprint images is one of a left loop class of fingerprint images, a right loop class of fingerprint images, a whorl loop class of fingerprint images, and an arch loop class of fingerprint images.

According to another aspect, the present disclosure is directed at a method for classifying dominant singularity in a digital fingerprint image, the method compromising the steps of: (a) enhancing the digital fingerprint image to generate an enhanced digital fingerprint image; (b) analyzing image features within each of a predetermined number of local segments of the enhanced digital fingerprint image to translate the image features into orientations that estimate dominant structures in the underlying enhanced digital fingerprint image; (c) determining, for each of a predetermined number of major blocks in the enhanced digital fingerprint image, a dominant orientation of ridge and valley patterns in the enhanced digital fingerprint image, wherein each major block comprises multiple local segments; (d) generating an Orientation Feature Vector by listing, according to a predetermined sequence, the dominant orientations of each of the major blocks of the enhanced digital fingerprint image; (e) providing a bank of regular expressions corresponding to a class of fingerprint images, wherein each regular expression describes sequences of dominant orientations associated with Orientation Feature Vectors generated from digital fingerprint images belonging to the class of fingerprint images; and (f) determining whether the digital fingerprint image belongs to the class of fingerprint images by determining whether any of the regular expressions in the bank of regular expressions match the Orientation Feature Vector generated in step (d).

In some embodiments, step (a) further comprises applying a digital filter to the digital fingerprint image to decrease noise in the digital fingerprint image.

In some embodiments, step (a) further comprises segmenting the digital fingerprint image into multiple equally sized regions, and increasing contrast of ridge/valley pixel intensities within each equally sized region.

In some embodiments, step (a) further comprises extracting a binary image from the digital fingerprint image by classifying pixels of the digital fingerprint image as ridge pixels or valley pixels.

In some embodiments, step (a) further comprises convolving a structure element with the digital fingerprint image.

In some embodiments, step (a) further comprises generating gradient vectors based on directions of underlying features in the digital fingerprint image.

In some embodiments, the method further includes: receiving a training digital fingerprint image that belongs to the class of fingerprint images; generating a training Orientation Feature Vector from the training digital fingerprint image; determining a regular expression in the bank of regular expressions that matches with the training Orientation Feature Vector; and promoting the matching regular expression to a higher priority in the bank of regular expressions.

In some embodiments, the class of fingerprint images is one of a left loop class of fingerprint images, a right loop class of fingerprint images, a whorl loop class of fingerprint images, and an arch loop class of fingerprint images.

In another aspect, the present disclosure is directed at a system for classifying dominant singularity in a digital fingerprint image, the system comprising: at least one memory storing instructions and a bank of regular expressions corresponding to a class of fingerprint images, wherein each regular expression describes sequences of dominant orientations associated with previous Orientation Feature Vectors generated from digital fingerprint images belonging to the class of fingerprint images; and a processor configured to execute the instructions in order to: enhance the digital fingerprint image to generate an enhanced digital fingerprint image; analyze image features within each of a predetermined number of local segments of the enhanced digital fingerprint image to translate the image features into orientations that estimate dominant structures in the underlying enhanced digital fingerprint image; determine, for each of a predetermined number of major blocks in the enhanced digital fingerprint image, a dominant orientation of ridge and valley patterns in the enhanced digital fingerprint image, wherein each major block comprises multiple local segments; generate an Orientation Feature Vector by listing, according to a pre-determined sequence, the dominant orientations of each of the major blocks of the enhanced digital fingerprint image; and determine whether the digital fingerprint image belongs to the class of fingerprint images by determining whether any of the regular expressions in the bank of regular expressions match the Orientation Feature Vector generated from the enhanced digital fingerprint image.

DETAILED DESCRIPTION

The system and method of the present invention provide a novel improved model for fingerprint classification that includes a Regular Expressing Machine ("REM") prediction model. More particularly, the present invention provides a fingerprint classification system and method for extracting the dominant singularity from a fingerprint image. For example, the presently disclosed fingerprint classification system can be trained to classify fingerprint images into one of four distinct categories: left loop fingerprints, right loop fingerprints, whorl loop fingerprints, and arch loop fingerprints. This classification system can be useful when attempting to match an unknown fingerprint to a database of known fingerprints by narrowing the portion of the database that needs to be searched.

The fingerprint classification system can be trained using a set of training images of fingerprints. Each training image can be pre-labeled to indicate what type of fingerprint each image represents, such as "left loop", "right loop", "whorl loop", and "arch loop." During training, each training image can be preprocessed to produce an enhanced image. Next, feature pattern calculations are performed on the enhanced image to generate an Orientation Feature Vector corresponding to the training image. The generated Orientation Feature Vector is then used to adjust and tune parameters (e.g., a decision tree comprising a prioritized set of Regular Expressions, as described in further detail below) in the fingerprint classification system. This process is repeated with each training image in the training set until the fingerprint classification is fully trained.

Once the fingerprint classification system has been trained, the fingerprint classification system can be used to classify a given fingerprint image into one of several categories, such as "left loop", "right loop", "whorl loop", and/or "arch loop" fingerprints. Other types of categories are also possible. At a high level, the classification process works by preprocessing the given fingerprint image to produce an enhanced image. Next, feature pattern calculations are performed on the enhanced image to generate an Orientation Feature Vector. The Orientation Feature Vector generated from the given fingerprint image is then processed using the trained fingerprint classification system to generate a class label for the digital fingerprint image that was originally inputted.

1. Extracting an Orientation Feature Vector from a Fingerprint Image

Figure 1:
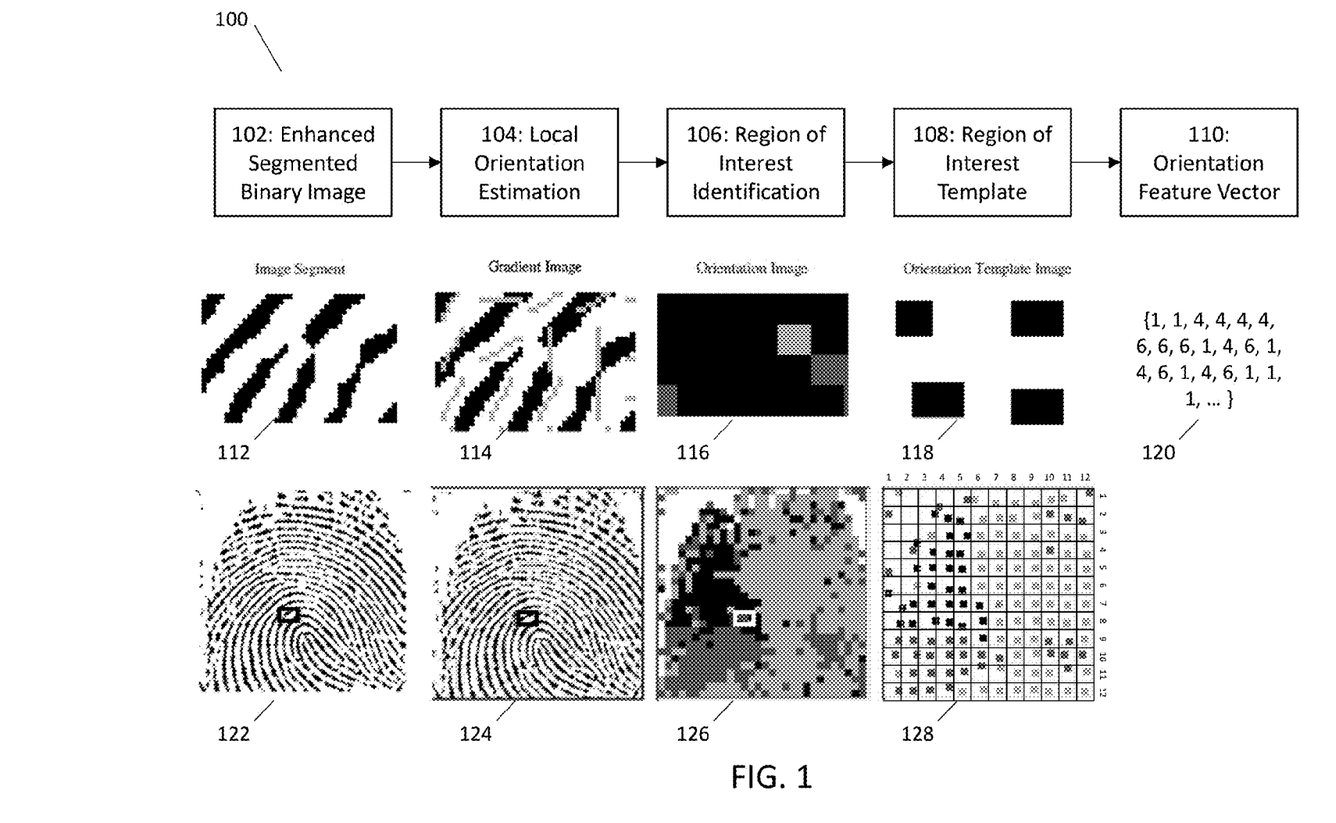
FIG. 1 is a flowchart depicting an exemplary process for extracting an Orientation Feature Vector from a fingerprint image, according to some embodiments.

Now, the present fingerprint classification system will be described in more detail. FIG. 1 is a flowchart depicting an exemplary process 100 for extracting an Orientation Feature Vector from a fingerprint image, according to some embodiments. At step 102 ("Enhanced Segmented Binary Image"), one or more image enhancement algorithms is applied to an input image to generate an enhanced digital fingerprint image. Exemplary image enhancement algorithms are described in more detail with reference to FIG. 6. A zoomed-in view of an exemplary output of step 102 is depicted at 112, while a zoomed-out view of the exemplary output is depicted at 122. Step 102 may be performed by an image enhancement unit which may comprise, according to different embodiments, hardware, software executing on one or more computer processors, or a combination of hardware and software.

Figure 2:
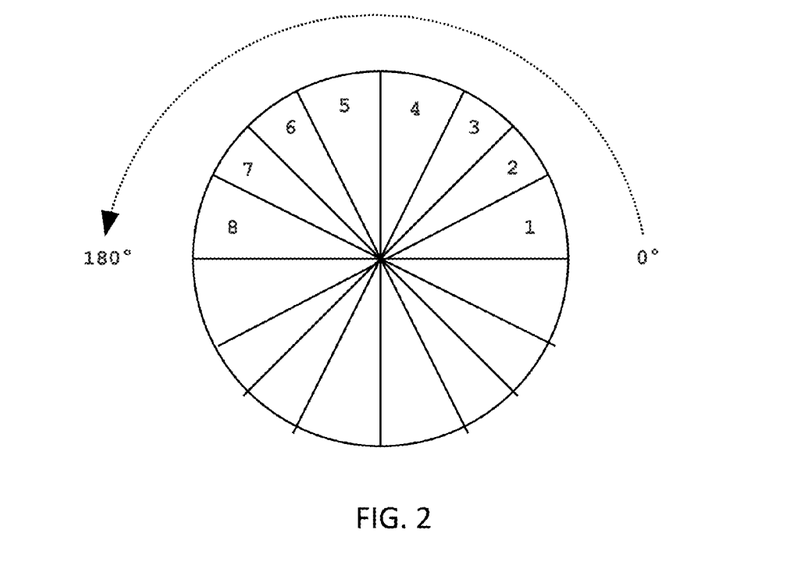
FIG. 2 depicts exemplary labels that can be assigned to orientation angles of ridge and/or valley structures in a fingerprint image, according to some embodiments.

At step 104 ("Local Orientation Estimation"), process 100 estimates the orientation of local ridge structures in the enhanced fingerprint image. At this step, the fingerprint image is segmented into grids consisting of 10×10 blocks of pixels to better analyze the ridge structures of the fingerprint image. Other size blocks of pixels, such as 5×5, 15×15, 20×20, or 50×50 are also possible—furthermore, blocks of pixels need not be square in shape but may also be rectangular, or any other shape. However, for ease of explication, the size of each block is assumed to be 10×10 in the present example. The pixels of each 10×10 block is then analyzed to determine an orientation of the ridge structure depicted within that 10×10 block, wherein the orientation comprises an orientation angle between 0 and 180°, as depicted in FIG. 2. In some embodiments, each 10×10 block of pixels can also be assigned a label, such as a label between 1 and 8 according to Table 1 below, and also as depicted pictorially in FIG. 2. Other types and/or numbers of labels are also possible. A zoomed-in view of an exemplary output of step 104 is depicted at 114, while a zoomed-out view of the exemplary output is depicted at 124. Step 104 may be performed by a feature extraction and analysis unit which may comprise, according to different embodiments, hardware, software executing on one or more computer processors, or a combination of hardware and software.

TABLE 1

| Label | Range |
|---|---|
| 1 | 0-23° |
| 2 | 24-47° |
| 3 | 48-71° |
| 4 | 72-95° |
| 5 | 96-119° |
| 6 | 120-143° |
| 7 | 144-167° |
| 8 | 168-191° |

Figure 3:
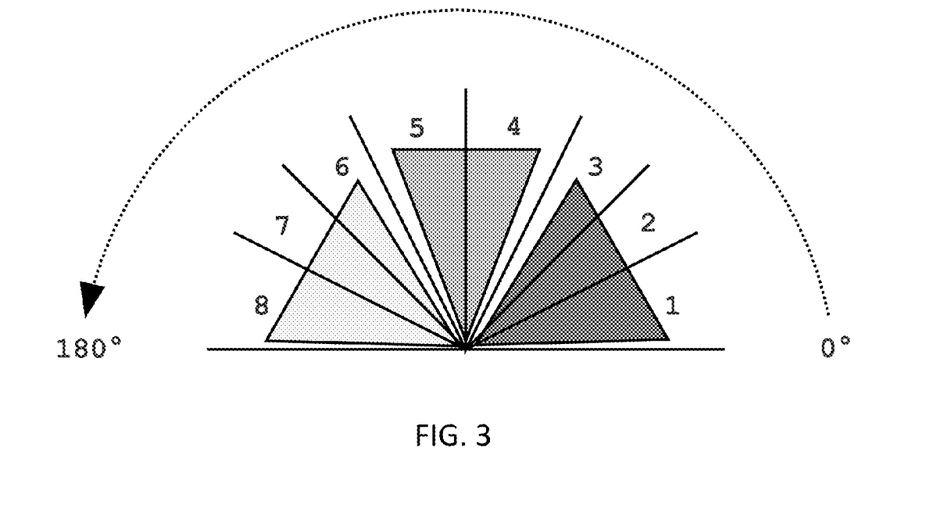
FIG. 3 depicts an exemplary higher-level labeling scheme that can be used to label orientation angles of ridge and/or valley structures in a fingerprint image, according to some embodiments.

At step 106 ("Region of Interest Identification"), process 100 assigns higher-level labels to each 10×10 block of pixels. This higher-level labeling provides a higher level of abstraction to the underlying indivisible gradient feature vector. For example, this higher-level labeling process can assign the labels "Label 1", "Label 4", and "Label 6" to each 10×10 block of pixels according to Table 2 below. The gradient angle ranges used in this higher-level labeling process are shown in FIG. 3. A zoomed-in view of an exemplary output of step 106 is depicted at 116, while a zoomed-out view of the exemplary output is depicted at 126. In the views depicted at 116 and 126, dark grey indicates "label 1", light grey indicates "label 4", and white indicates "label 6," also as depicted in FIG. 3. Step 106 may also be performed by the feature extraction and analysis unit.

| Label 1 | Label 4 | Label 6 |
|---|---|---|
| 0-23° | 72-95° | 120-143° |
| 24-47° | 96-119° | 144-167° |
| 48-73° | | 168-191° |

At step 108 ("Region of Interest Template"), the image is divided into multiple major blocks. In the exemplary example depicted in FIG. 1, the entire image is divided into 12 major blocks horizontally and 12 major blocks vertically, resulting in 144 major blocks total. In other embodiments, the image may be divided into a larger or smaller number of major blocks. For each major block, the "dominant" orientation label (wherein the dominant orientation label is selected from the exemplary set {Label 1, Label 4, Label 6}) is determined. For example, for a given major block, the label (from the exemplary set {Label 1, Label 4, Label 6}) for each of the 10×10 blocks appearing within that major block is analyzed and/or counted, and the label that appears the most often is determined to be the "dominant" label for that major block. If the image cannot be enhanced within a major block, then a zero is assigned as the label. Step 108 may be performed by a major block segmentation unit which may comprise, according to different embodiments, hardware, software executing on one or more computer processors, or a combination of hardware and software.

At step 110 ("Orientation Feature Vector"), process 100 generates an Orientation Feature Vector that describes the orientation of different parts of the entire digital fingerprint image. The Orientation Feature Vector may include a sequence of numeric values in which each component of the vector belongs to the set {Label 0, Label 1, Label 4, Label 6}. The Orientation Feature Vector may be determined by listing, according to a pre-determined sequence, the dominant label for each major block determined at step 108. For example, the Orientation Feature Vector may be generated by listing the dominant label for each major block by reading major blocks from top-to-bottom, and then from left-to-right. In this way, the Orientation Feature Vector summarizes the orientation of different portions of the digital fingerprint image. Since the example depicted in FIG. 1 includes 144 major blocks total, the Orientation Feature Vector generated as part of step 110 (depicted at 120) may comprise 144 separate components. Step 110 may be performed by a feature orientation calculation and extraction unit which may comprise, according to different embodiments, hardware, software executing on one or more computer processors, or a combination of hardware and software.

2. Training the Fingerprint Classification System

Training is an element in the development of the presently disclosed fingerprint classification system. A goal of the supervised machine learning strategy is to train a prediction model to learn a generalization from data containing a set of domain related examples and then classify a new input object. In the presently disclosed supervised learning system, an input object is taken from an input space and converted to a vector in feature space. A training set is used because the presently disclosed fingerprint classification system incorporates learning through data.

According to the invention, a training set can comprise a collection of digital fingerprint images. During the training process, each fingerprint image in the training set is first enhanced by applying a series of image enhancement algorithms. Features are extracted from the enhanced image to produce feature vectors. A gradient feature vector can be constructed from these produced feature vectors, wherein the gradient feature vector represents a relatively low level of abstraction of the digital fingerprint image. A high level of detail is captured by the gradient feature vector. This gradient feature vector is then transformed to generate an Orientation Feature Vector, as described above in relation to FIG. 1. The Orientation Feature Vector represents a relatively high level of abstraction of the digital fingerprint image, and captures the dominant orientation of the ridge patterns of the entire fingerprint image.

According to some embodiments of the invention, fingerprints can be classified according to several dominant fingerprint classes, such as left loop, right loop, whorl loop, and arch loop. The training set of images, and the corresponding Orientation Feature Vectors produced from each image in the training set of images, can therefore be partitioned or pre-labeled in advance (e.g., through manual identification, or other method of classifying the training images) into four sets representing each of these classes.

The fingerprint classification system can also comprise multiple "regular expressions". Regular expressions are sequences of characters and/or wildcards that are used to define a search pattern or sequence of strings to look for within a given Orientation Feature Vector. A regular expression can also be described as a set of terminal symbols and operators that denote a set of strings and the operations that can be performed on these strings. For example, the regular expression "(+1+4+6+)+[0146]+(+1+4+6+)+" specifies an Orientation Feature Vector that has the following features:

Has a sub-string that comprises one or more "1s", followed by one or more "4s", followed by one or more "6s";

Followed by one or more sub-strings [0146]; and

Followed by another sub-string that comprises one or more "1s", followed by one or more "4s", followed by one or more "6s".

Any Orientation Feature Vector that satisfies these conditions is said to "match" with the regular expression "(+1+4+6+)+[0146]+(+1+4+6+)+" Other types of regular expressions, and/or other syntax for expressing regular expressions are also possible.

The regular expressions in the fingerprint classification system can be organized into multiple "banks" of regular expressions, wherein each bank represents a dominant fingerprint class, e.g., left loop, right loop, whorl loop, and arch loop. These banks of regular expressions may be populated in advance during a "seed process" with the aid of one or more human operators, and/or automated computer processes. Each bank of regular expressions comprises a decision tree of regular expressions that arranges regular expressions in priority order. As described in further detail below, each regular expression in the decision tree can have an associated count of how frequently that regular expression matched an Orientation Feature Vector in a training image. This frequency count can serve as a weight and the list can be sorted so that the regular expressions with higher frequency counts are listed first, and regular expressions with lower frequency counts are listed later.

During the training process, regular expressions that are found to reliably and/or frequently match fingerprints belonging to the fingerprint class to which that bank of regular expressions pertains are promoted or increased in priority within that decision tree. Conversely, regular expressions that do not reliably and/or frequently match fingerprints belonging to the fingerprint class to which that bank of regular expressions pertains can be optionally demoted or decreased in priority within that decision tree. So for example, if, during the training process, regular expression X within the "left loop" bank of regular expressions is found to reliably and/or frequently match with training images of left loop fingerprints, regular expression X will be promoted to a position of relatively high priority within the "left loop" bank's decision tree of regular expressions. Conversely, if regular expression Y within the "left loop" bank of regular expressions does not frequently match with any of the training images of left loop fingerprints, regular expression Y can be optionally demoted to a position of relatively low priority within the "left loop" bank's decision tree of regular expressions. If necessary, new regular expressions can also be constructed and added to the appropriate bank to match patterns that occur frequently in Orientation Feature Vectors generated from training images. Multiple regular expressions may also be combined to form new regular expressions.

In some embodiments, the use of regular expressions can be an important feature in the training process of the fingerprint classification system because regular expressions have the ability to classify orientation feature patterns belonging in a class of fingerprint images. These regular expressions can therefore be used to describe the dominant singularity of a fingerprint image, but also predict the class of a previously unseen fingerprint image. This approach of using regular expressions can be powerful because it reduces the complexity and computational effort of modeling a solution in an N dimensional vector space. This is at least partially because a single regular expression can be used to classify, represent and describe a collection of input training data. As the fingerprint classification system grows in complexity, more and more regular expressions can be added to form a bank of regular expressions that fully describe the features of a class of fingerprint images. As a result, the use of regular expressions to describe Orientation Feature Vectors having the characteristics described herein can enable the presently disclosed fingerprint classification system to operate faster and/or more efficiently (e.g., by using less memory and/or less processor-intensive calculations) than previously known fingerprint classification systems, while also achieving high accuracy and reliability in classifying fingerprints into different classes.

Figure 4A:
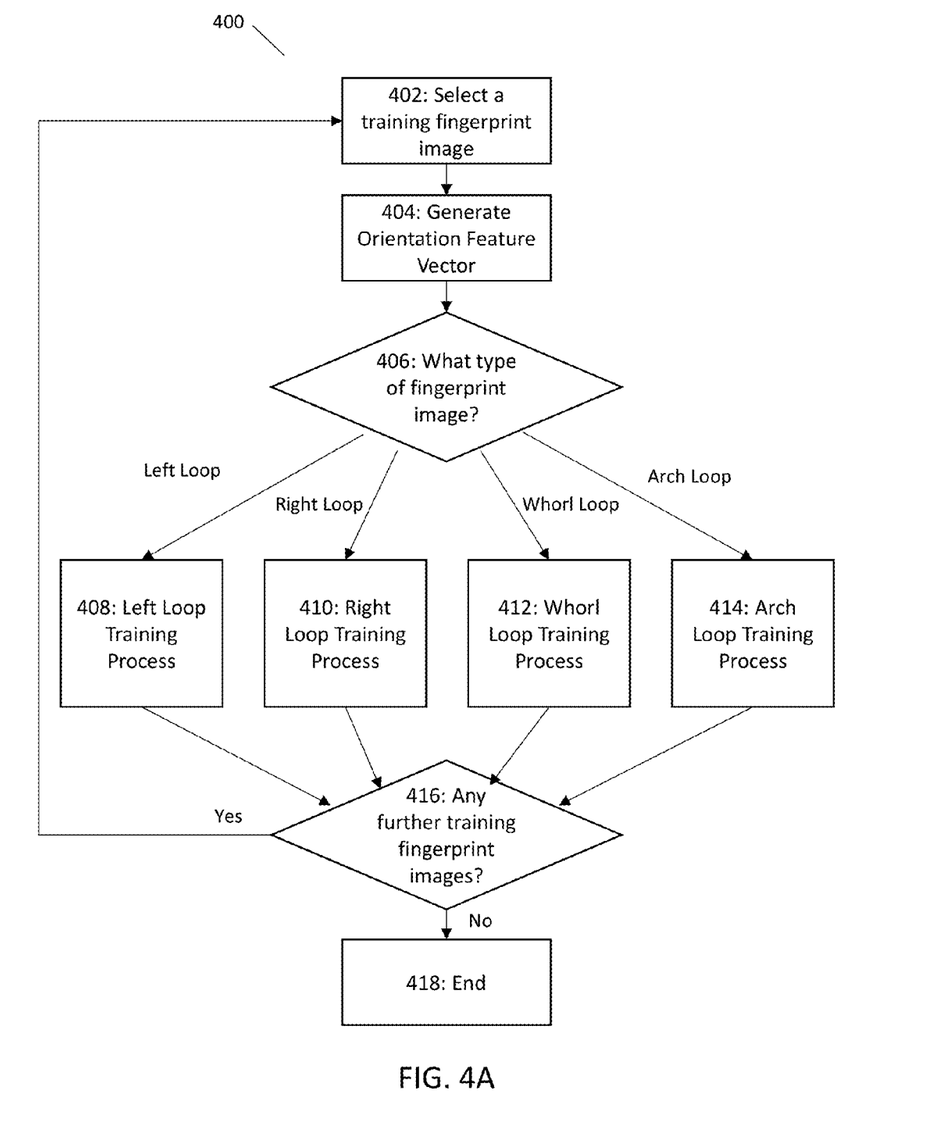
FIG. 4A is a flowchart depicting an exemplary process for training a supervised machine learning algorithm for classifying fingerprints, according to some embodiments.

FIG. 4A depicts a process 400 for training a supervised machine learning algorithm for classifying fingerprints, according to some embodiments. According to certain embodiments, process 400 may be performed by a training management unit, which may comprise hardware, software executed on one or more computer processors, or a combination of hardware and software. At step 402, a training fingerprint image from a set of training fingerprint images is selected.

At step 404, process 400 generates an Orientation Feature Vector from the selected training fingerprint image, according to the process described above in relation to FIG. 1.

At step 406, the pre-label of the selected training fingerprint image is consulted. If the selected training fingerprint image has been pre-labeled as a left loop image, process 400 branches to step 408, which implements a left loop training process. If the selected training fingerprint has been pre-labeled as a right loop image, process 400 branches to step 410, which implements a right loop training process. If the selected training fingerprint has been pre-labeled as a whorl loop image, process 400 branches to step 412, which implements a whorl loop training process. If the selected training fingerprint has been pre-labeled as an arch loop image, process 400 branches to step 414, which implements an arch loop training process. When the selected training process is complete, process 400 branches to step 416.

At step 416, process 400 determines if there are any further training fingerprint images. If there are further training images to process, process 400 branches back to step 402. If there are no further training images to process, process 400 branches to step 418 and ends.

Figure 4B:
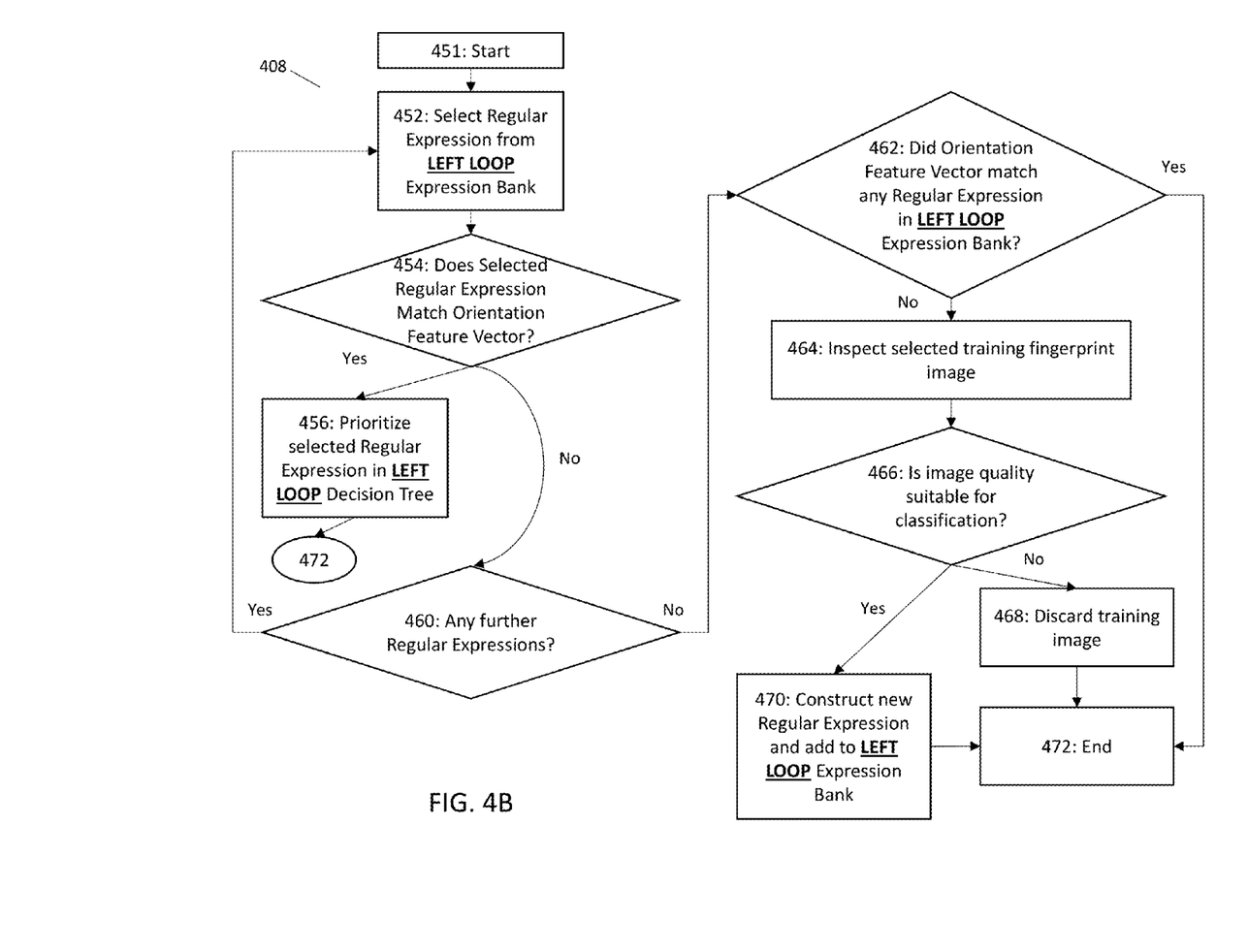
FIG. 4B is a flowchart depicting an exemplary process for implementing a left loop training process, according to some embodiments.

FIG. 4B depicts step 408 (Left Loop Training Process) in more detail, according to some embodiments. At step 451, process 408 begins. At step 452, process 408 selects a regular expression from the left loop expression bank.

At step 454, process 408 determines whether the selected regular expression matches the Orientation Feature Vector of the training fingerprint image being analysed at that moment (e.g., the Orientation Feature Vector generated at step 404 in FIG. 4A). If the selected regular expression matches the Orientation Feature Vector, process 408 branches to step 456, at which the selected regular expression is prioritized or promoted in the decision tree of the left loop bank of regular expressions. In some embodiments, this can be accomplished by increasing the frequency count associated with the selected regular expression, and appropriately re-ordering the priority of regular expressions in the decision tree if the updated frequency count requires that the selected regular expression be moved up in priority. After prioritizing the selected regular expression and/or increasing the selected regular expression's frequency count, process 408 branches to step 472, where it ends.

If the selected regular expression does not match the Orientation Feature Vector, process 408 branches to step 460, at which process 408 determines if there are any further regular expressions to consider within the left loop bank of regular expressions. If yes, process 408 branches to step 452, at which another regular expression is selected. If not, process 408 branches to step 462.

At step 462, process 408 determines whether the Orientation Feature Vector matched any regular expressions in the left loop expression bank. If yes, process 408 branches to step 472, at which process 408 ends. If not, process 408 branches to step 464, at which the selected training fingerprint image is inspected to determine if the image quality of the selected image is suitable for classification. In some embodiments, this inspection may comprise a manual inspection by a human operator. In other embodiments, this inspection may comprise a secondary level of automatic inspection by a computer process. In some embodiments, this inspection may comprise both further processing by a computer process as well as manual inspection by a human operator.

At step 466, process 408 evaluates the results of the inspection at step 464 to determine if the image quality of the selected image is suitable for classification. If not, process 408 branches to step 468, at which the selected training fingerprint image is discarded. Process 408 then branches to step 472, at which point process 408 ends.

If the selected image is suitable for classification, process 408 branches to step 470, at which a new regular expression is constructed and added to the left loop expression bank. This new expression can be constructed by a human operator as part of a manual process, by an automated computer process, or a combination of human input and automatic computer process. After this new regular expression is added to the left loop expression bank, this regular expression is assigned an appropriate priority and/or frequency count (e.g., a frequency count of 1). Process 408 then branches to step 472, where process 408 ends.

Process steps 410 (Right Loop Training Process), 412 (Whorl Loop Training Process), and 414 (Arch Loop Training Process) are substantially similar to process 408 depicted in FIG. 4B. For example, the appropriate type of fingerprint classification ("Right Loop", "Whorl Loop", or "Arch Loop") can be substituted into the underlined and capitalized portions of FIG. 4B to implement the corresponding type of training process. The description of the left loop training process above can be similarly adapted to describe other types of fingerprint classification (e.g., right loop, whorl loop, or arch loop training processes).

3. Using the Trained Fingerprint Classification System

Figure 5:
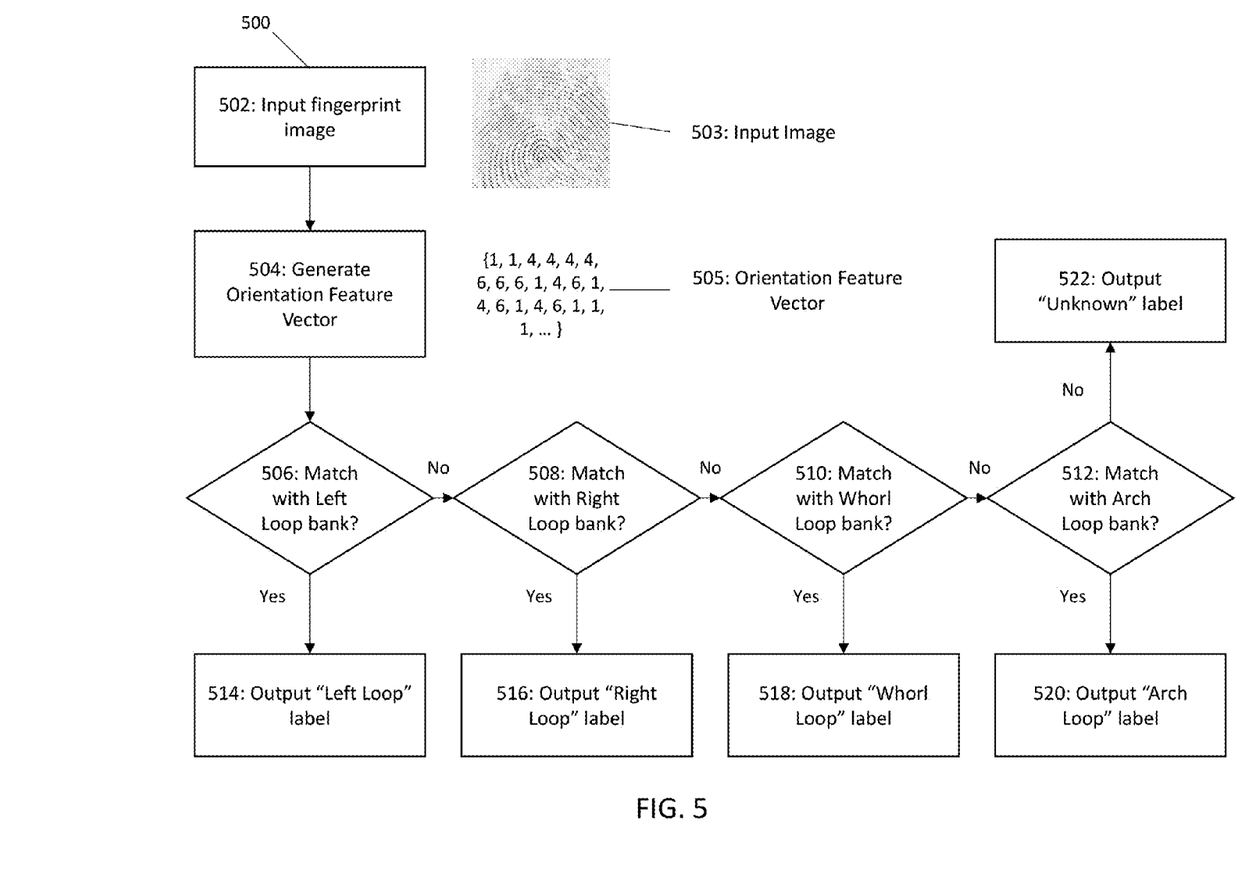
FIG. 5 is a flowchart depicting an exemplary process for using the fingerprint classification system to classify an input fingerprint, according to some embodiments.

Once the fingerprint classification system has been trained, it can then be used to classify input fingerprint images into different fingerprint classes (e.g., left loop, right loop, whorl loop, or arch loop). FIG. 5 shows a flow diagram of a process 500 for using the fingerprint classification system to classify an input fingerprint, according to some embodiments. According to some embodiments, process 500 may be performed by a Regular Expression Matching unit, which may comprise hardware, software executed on one or more computer processors, or a combination of hardware and software.

At step 502, a fingerprint image is input into the fingerprint classification system. An exemplary fingerprint image is depicted at 503.

At step 504, an Orientation Feature Vector is generated from the input image 503. This Orientation Feature Vector can be generated using a process similar or analogous to that described above in relation to FIG. 1. An exemplary Orientation Feature Vector is depicted at 505.

At step 506, process 500 determines whether the Orientation Feature Vector generated at step 504 matches with a regular expression in the left loop bank. In some embodiments, the Orientation Feature Vector can be compared with each regular expression in the left loop bank in descending order of priority or frequency count. If a match is found, step 506 terminates and branches to step 514, where process 500 outputs a "Left Loop" label. In some embodiments, once a match is found, all regular expressions of lower priority than the matched regular expression are not considered. This can save computational effort and speed response times—since regular expressions of higher priority and/or frequency counts are considered first, and since the comparison process terminates once a match is found, the fingerprint classification system is more likely to return a label faster than if regular expressions were not prioritized. In some embodiments, process 500 can also output a confidence value at step 514 indicating the likelihood that the fingerprint image belongs to the labelled class (e.g., "left loop"). This confidence value can be determined based at least in part by the frequency count and/or priority of the regular expression that matched with the Orientation Feature Vector generated at step 504. If the matched regular expression has a relatively high priority and/or frequency count, the confidence value can be higher than if the matched regular expression has a relatively lower priority and/or frequency count.

If no match is detected at step 506, process 500 branches to step 508, which repeats the same process as step 506 for the right loop bank instead of the left loop bank. At step 508, process 500 determines whether the Orientation Feature Vector generated at step 504 matches with a regular expression in the right loop bank. If a match is found, step 508 branches to step 516, where process 500 outputs a "Right Loop" label. Just as in step 514, process 500 may optionally output a confidence value at step 516 based on the frequency count and/or priority of the regular expression that matched with the Orientation Feature Vector at step 508.

If no match is detected at step 508, process 500 branches to step 510, which repeats the same process as steps 506 for the whorl loop bank instead of the left loop bank. At step 510, process 500 determines whether the Orientation Feature Vector generated at step 504 matches with a regular expression in the whorl loop bank. If a match is found, step 510 branches to step 518, where process 500 outputs a "Whorl Loop" label. Just as in step 514, process 500 may optionally output a confidence value at step 518 based on the frequency count and/or priority of the regular expression that matched with the Orientation Feature Vector at step 510.

If no match is detected at step 510, process 500 branches to step 512, which repeats the same process as steps 506 for the arch loop bank instead of the left loop bank. At step 512, process 500 determines whether the Orientation Feature Vector generated at step 504 matches with a regular expression in the arch loop bank. If a match is found, step 512 branches to step 520, where process 500 outputs an "Arch Loop" label. Just as in step 514, process 500 may optionally output a confidence value at step 520 based on the frequency count and/or priority of the regular expression that matched with the Orientation Feature Vector at step 512.

If no match is detected at step 512, process branches to step 522, which outputs an "unknown" label. Optionally, a secondary review process may be implemented at step 522. This secondary review process may comprise a manual review of the input fingerprint image 503 by a human operator. If the human operator determines that the fingerprint image is suitable for classification, the human operator may assign a label to the input image, and construct and/or add one or more new regular expressions to the bank of regular expressions corresponding to that assigned label. These new regular expressions can be designed to match the Orientation Feature Vector generated from the input image, and to ensure that fingerprint images similar to the input image would be correctly classified in the future. If the input fingerprint image is not suitable for classification (e.g., if the image is only a partial image, is dirtied/smudged, of poor quality, or otherwise unsuitable for analysis), the system can maintain its "unknown" label, and/or discard or ignore the image.

Although FIG. 5 depicts matching the Orientation Feature Vector with banks of regular expressions in a certain order (e.g., "Left Loop", "Right Loop", "Whorl Loop", followed by "Arch Loop"), the Orientation Feature Vector may also be matched with the banks of regular expressions in different orders. Furthermore, although the present fingerprint classification system categorizes fingerprints according to the four categories depicted in FIG. 5 (i.e., "Left Loop", "Right Loop", "Whorl Loop", and "Arch Loop"), the presently disclosed fingerprint classification system may also be adapted to categorize fingerprints according to other types of classification schemes.

4. Image Enhancement

The fingerprint classification system can employ image pre-processing as part of its image enhancement strategy. This enhancement process can directly and/or indirectly affect the quality of the features extracted from the enhanced image as well as the accuracy of the classifier. Poor image enhancement can lead to a higher probability of noise in the image which can result in incorrectly identifying important features that are needed to correctly classify the image.

A fingerprint is formed by the representation of a fingertip epidermis produced when the fingerprint is pressed against a smooth surface. The representation consists of a pattern of interleaved ridges and valleys. This pattern of interleaved ridges and valleys can be the most important structural characteristic of a fingerprint. Ridges and valleys usually run in parallel with each other, however, sometimes they bifurcate or terminate.

Different regions of a fingerprint contain ridge lines that assume distinctive shapes or patterns. These regions are characterized by ridge and valley patterns with high curvature or frequent terminations and are sometimes called singularities or singular regions. Fingerprint patterns can be classified according to four main typologies: left loop, right loop, arch loop, or whorl loop.

Figure 6:
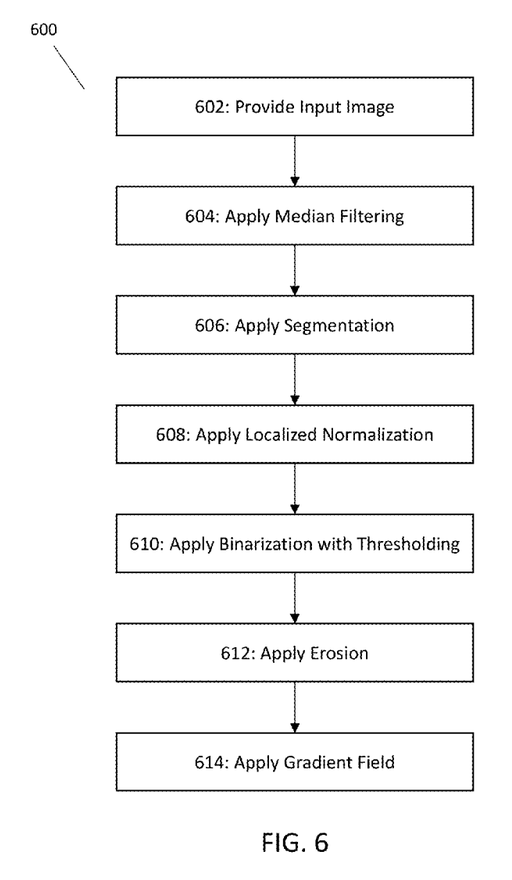
FIG. 6 is a flowchart depicting an exemplary process for enhancing a fingerprint image, according to some embodiments.

FIG. 6 shows a flow diagram depicting an exemplary process 600 for enhancing a fingerprint image, according to some embodiments. At step 602, an input fingerprint image is provided. At step 604, a modified median filter is applied to the input fingerprint image. Median filters can be well suited to remove certain types of noise from digital images while preserving edges. This can be important because many digital fingerprint images contain considerable noise which need to be removed before feature extraction could occur.

Median filtering can be described as a non-linear digital filtering process which is often used for the removal of impulsive or salt and pepper noise while preserving important features within the image such as edges. According to some embodiments, the median filter operates by sorting each pixel within a neighbourhood according to intensity, and then replacing the intensity of the pixel under consideration with the middle value of this sorting process. According to some embodiments, step 604 may be performed by an image filter subunit of the image enhancement unit, wherein the image filter subunit may comprise hardware, software executing on one or more computer processors, or a combination of hardware and software.

At step 606, a local segmentation process is applied to the median filtered image. At a high level, and according to some embodiments, the segmentation process divides the image into non-overlapping regions that capture mean, variance and standard deviation parameters within a neighbourhood of pixels. This has the advantage of providing a more context sensitive contrast enhancement which is well suited for digital fingerprint images that have large standard deviations in their pixel intensities.

In more detail, according to some embodiments, segmentation can be a fingerprint enhancement technique that seeks to improve or remove regions in the fingerprint image that have been corrupted by noise or have been poorly captured by the fingerprint capturing device. According to some embodiments, image segmentation divides the image into several equally sized regions, such as blocks of pixels 10×10 in size (although other sized or shaped regions are also possible). For each region or local segment, the mean, variance and standard deviation of pixel intensity values are computed and stored. Generally, each local segment may have quite varying measures for the mean and standard deviations. This segmented approach provides an opportunity to more closely fine tune the enhancement of the image so that the underlying ridge and valley structures can be better enhanced for feature extraction. Certain regions or local segments may also be excluded from the image at this step because these areas are derived from either noise in the digital image capture due to foreign substances, e.g., dirt and grease, or incorrect application or poor contact with the capture device surface. The lack of pixel information in these regions make it improbable to accurately enhance such areas and these regions are therefore excluded from processing. According to some embodiments, step 606 may be performed by a segmentation subunit of the image enhancement unit, wherein the segmentation subunit may comprise hardware, software executing on one or more computer processors, or a combination of hardware and software.

At step 608, a localized normalization process is applied to produce more tailored contrast enhancement in each local region or segment. This process seeks to establish the mean or average pixel intensity of a grey-scale fingerprint image. The computation of this average allows the variance of pixel intensities to be computed and it is this value that is used to determine whether a segment of the image is too poorly captured from which to extract minutiae details. The computed average of pixel intensities can be used to normalize the image. The normalization process seeks to perpetuate a sharpened image by increasing the contrast between the ridges and valleys in the image. In some embodiments, this process compares each pixel intensity value with the computed mean within its local region or segment. If a pixel intensity value lies within some specified range relative to the local mean, then its intensity may be changed to a lower or higher value accordingly. This process has the effect of sharpening the image and thus making it easier to perform feature extraction.

In equation form, the new pixel intensity value is determined by the following formula.

If I [x, y]>m, then:

$$I'[x,y]=m_0+\sqrt{(I[x,y]-m)^2 \cdot v_0/v}$$

Otherwise:

$$I'[x,y]=m_0-\sqrt{(I[x,y]-m)^2 \cdot v_0/v}$$

Where:
I' [x, y] is the new pixel intensity at location [x, y] in the fingerprint image
I [x, y] is the original pixel intensity at location [x, y] in the fingerprint image
$m_0$ is the new desired mean intensity value of the image, which can be an adjustable parameter
m is the computed mean intensity of pixels in the local region or segment that contains location [x, y] in the fingerprint image
$v_0$ is the new desired variance value in the enhanced fingerprint image, which can be an adjustable parameter
v is computed variance of pixel intensities in the local region or segment that contains location [x, y] in the fingerprint image According to some embodiments, this method computes mean and variance values and takes as input the pixel intensity value to be processed, the desired mean, and the desired variance. The normalization process, like other image enhancement methods is a pixel-wise operation. The results of the normalized pixel intensity depend on its previous value. This operation should not change the ridge and valley structure—while the values of individual pixels may change, the overall structure of the ridges and valleys should remain the same. Furthermore, by performing this normalization process separately for each local region or segment computed in step 606, a better contrast between ridges and valleys can be obtained. Although this process can be computationally more expensive, it yields better results and provides a richer enhancement of the overall image, better reflecting the true underlying ridge formation of the fingerprint image. Further details regarding this localized normalization process can be found in Hong, Y. Wan and A. Jain, 1998, "Fingerprint Image Enhancement: Algorithm and performance Evaluation," *Pattern Analysis and Machine Intelligence* Vol. 20, Issue 8, 777-789, the entire contents of which are hereby incorporated by reference. According to some embodiments, step 608 may be performed by an image normalization subunit of the image enhancement unit, wherein the normalization subunit may comprise hardware, software executing on one or more computer processors, or a combination of hardware and software.

At step 610, a binarization process can be applied to the fingerprint image, according to some embodiments. Fingerprint images prior to this step usually contain pixels of intensities ranging from, for example 0 (black) to 255 (white). The binarization process is a pixel-wise operation that seeks to produce a binary image which contains only two intensities of interest, i.e., black or white. This enhancement step dramatically increases the contrast between ridges and valleys, as well as reduce the computational effort needed to extract minutiae details and other feature extraction techniques.

According to some embodiments, a local threshold value is used in computing the binary image of a grey-scale fingerprint image. In embodiments where pixels range in intensity from, for example, 0 (black) to 255 (white), ridges can be denoted with pixel intensities of zero (e.g., ridge pixels) and valleys can be determined by pixel intensities of 255 (e.g., valley pixels). In other embodiments, ridges can also be denoted with white pixels (e.g., an intensity value of 255) while valleys can be denoted with black pixels (e.g., an intensity value of 0)—however, solely for ease of explication, it is assumed herein that ridges are denoted with black pixels while valleys are denoted with white pixels. The binarization proceeds such that for each pixel in the image, if the intensity is below some user defined threshold value then the pixel's intensity is changed to black (e.g., an intensity value of 0), otherwise it is changed to white (e.g., an intensity value of 255). Also in some embodiments, a global threshold factor can be used for this user-defined threshold value. The global threshold factor can be dynamically adjusted during training or use of the fingerprint classification system. According to some embodiments, step 610 may be performed by a binary image extracting subunit of the image enhancement unit, wherein the binary image extracting subunit may comprise hardware, software executing on one or more computer processors, or a combination of hardware and software.

At step 612, an erosion operation can be applied to the fingerprint image. Erosion is a morphological image operation that can be applied to thin ridges in fingerprint images. In some embodiments, this process can be one of the final image enhancement processes before minutiae feature extraction takes place. The operation seeks to remove selected foreground pixels (e.g., pixels colored 0 or black) from binary images. The operation produces a skeletonized binary image as output. The skeletonized image is essentially a skeletal remnant of the original that largely preserves the extent and connectivity of pixels in the original image while at the same time eroding as much of the foreground pixels as possible.

Figure 7:
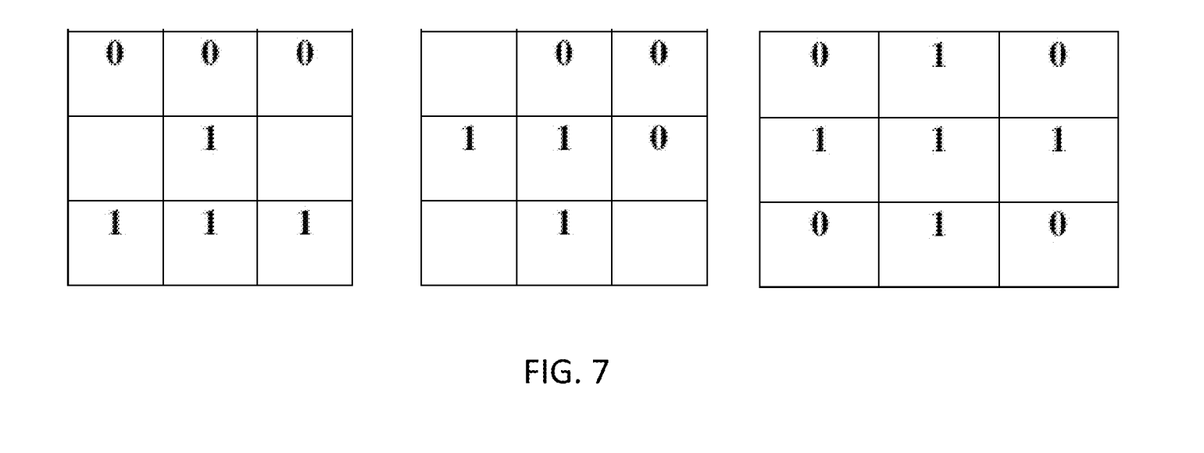
FIG. 7 depicts exemplary structure elements that may be used during an erosion processing step of an image enhancement process, according to some embodiments.

The behaviour of the erosion or thinning operation can be determined by a structure element used in the process. The structure element is essentially a type of kernel used in image convolution operations. It consists of a pattern of ones and zeros specified in a rectangular grid. It is possible for the structuring element grid to contain blanks or values other than ones or zeros depending on the type of image that needs to be operated on. The structuring element can be used to look for particular patterns of foreground and background pixels in an image. Three exemplary structure elements are depicted in FIG. 7.

The process works by first translating the origin (e.g., the center) of the structuring element to all points in the image and then comparing the structuring element with the underlying image pixels. If the foreground pixels (1) in the structuring element match the foreground pixels of the image (e.g., pixels are colored black), and the background pixels (0) in the structuring element match the background pixels of the image (e.g., pixels are colored white), then the pixel underneath the origin (e.g., center) of the structuring element is set to the foreground color (e.g., black). If the foreground and/or background pixels do not match, the pixel underneath the origin of the structuring element is set to the background color (e.g., white). According to some embodiments, step 612 may be performed by an erosion subunit of the image enhancement unit, wherein the erosion subunit may comprise hardware, software executing on one or more computer processors, or a combination of hardware and software.

At step 614, a gradient field operation can be applied to the fingerprint image. The gradient of an image can be described as the directional change in pixel intensity and can be used in edge detection calculations. The gradient of an image provides two important components and is easily represented as a vector. Firstly, the gradient provides information on how quickly the image intensity is changing, the second is the direction in which the image intensity changes most rapidly. One important feature that is derived from the gradient of an image is edge detection and image boundary analysis.

In some embodiments, process 600 can use a Canny edge detection mask. The Canny operator is described in further detail in, for example, Petrou, J. Kittler, 1988. On the optimal edge detector. Informatics Department, Rutherford Appleton Laboratory and Bin, Mehdi, 2012, "Comparison for Image Edge Detection Algorithms," *IOSR Journal of Computer Engineering (IOSRJCE)* ISSN: 2278-0661 vol 2, 51-55, both of which are incorporated by reference herein in their entirety. The Canny operation is applied in the computation gradient field to obtain pixel wise gradient information for the image. The gradient field of a digital fingerprint image can be computed as follows:

$$G_H(i, j) = \frac{\partial}{\partial j} \text{Image}(i, j)$$

$$G_V(i, j) = \frac{\partial}{\partial i} \text{Image}(i, j)$$

$$\text{Grad}(i, j) = \frac{1}{W^2} \sum_{u=i-\text{round}\frac{W}{2}}^{i+\text{round}\frac{W}{2}} \sum_{v=j-\text{round}\frac{W}{2}}^{j+\text{round}\frac{W}{2}} \sqrt{G_H^2(u, v)^2 + G_V^2(u, v)^2}$$

Where,
H, V represents horizontal and vertical respectively
W=filter size, which in some embodiments, can be 9

Figure 8:
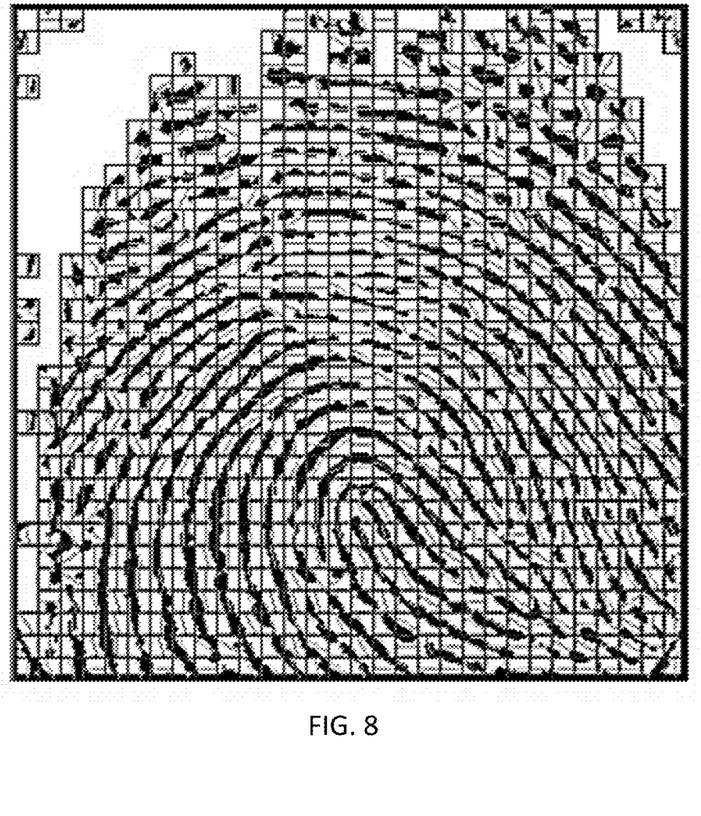
FIG. 8 depicts an exemplary output of a gradient field processing step of an image enhancement process, according to some embodiments.

The pixel wise image gradient information produces a histogram of gradients using a segmented strategy. In each segment, a canny edge-detection mask is convolved several times at different locations to produce information in the gradient feature space arranged as a histogram of gradients. The dominant gradient can be identified and the gradient feature space label is assigned to the segment. This process is repeated for each segment throughout the image and creates a collection of gradient feature vectors that represent the gradient image. An exemplary processed image, which includes a dominant gradient feature vector for each segment is shown in FIG. 8. According to some embodiments, step 614 may be performed by a gradient field subunit of the image enhancement unit, wherein the gradient field subunit may comprise hardware, software executing on one or more computer processors, or a combination of hardware and software.

Each of the image enhancement techniques described above in steps 602, 604, 606, 608, 610, 612, and 614 can be efficient at addressing specific types of noise. Therefore, the combination of these techniques, as well as the order in which they are applied, can be important for achieving good image enhancement results. The specific types of techniques described above, as well as the order in which they have been presented, have been experimentally shown to deliver strong enhancement results.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

Figure 9:
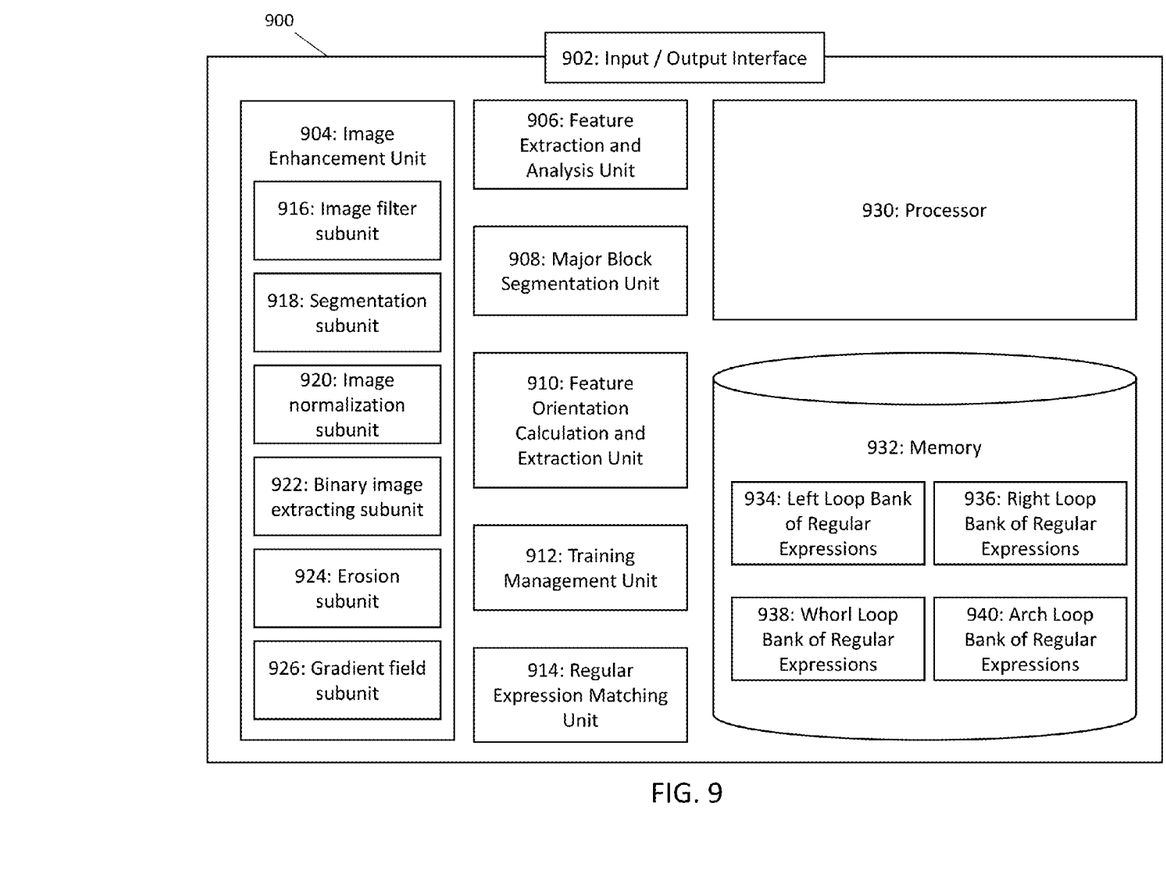
FIG. 9 depicts an exemplary system for implementing the fingerprint classification system, according to some embodiments.

FIG. 9 depicts an exemplary system 900 for implementing the fingerprint classification system, according to some embodiments. System 900 can comprise an input/output interface 902, one or more processors 930, and one or more memory 932. The input/output interface 902 may comprise any interface for transferring data into and/or out of system 900. Processors 930 may comprise different types of processing devices, including microcontrollers, general purpose microprocessors, digital signal processors (DSPs), an application specific integrated circuit (ASIC), reduced instruction-set computing (RISC) processors, and complex instruction-set computing (CISC) processors, among other processing devices. Memory 932 may comprise any type of computer-readable storage medium, such as main memory, cache memory, optical disk storage, flash storage, random access memory, or other type of memory that store electronic instructions to be executed by a microprocessor or store data that may be used in arithmetic operations. Memory 932 may store a left loop bank 934, a right loop bank 936, a whorl loop bank 938, and an arch loop bank 940. Each of these banks 934, 936, 938, and 940 may store the data and perform the functions described above.

System 900 can also comprise an image enhancement unit 904, a feature extraction and analysis unit 906, a major block segmentation unit 908, a feature orientation calculation and extraction unit 910, a training management unit 912, and regular expression matching unit 914. The image enhancement unit 904 can further comprise an image filter subunit 916, a segmentation subunit 918, an image normalization subunit 920, a binary image extracting subunit 922, an erosion subunit 924, and a gradient field subunit 926. Each of these units and subunits may be configured to perform the functions described above. Each of these units and/or subunits may comprise dedicated hardware devices, e.g., DSPs, or ASICs, configured to perform their specified functions. Although these units and/or subunits are depicted as separate components, some embodiments may combine or aggregate some or all of these units/subunits into larger components. Other embodiments may break up one or more of these units/subunits into multiple components that work together to accomplish the functions described above. Some or all of these units and/or subunits may also take the form of programs, or components of programs, stored as computer instructions on the memory 932 and executed on processor 930.

Various modifications to the disclosed embodiments will be apparent to those skilled in the art, and the general principals set forth below may be applied to other embodiments and applications. Thus, the present invention is not intended to be limited to the embodiments shown or described herein.

What is claimed is:

1. A system for classifying dominant singularity in a digital fingerprint image, the system comprising:
    an image enhancement unit configured to enhance the digital fingerprint image to generate an enhanced digital fingerprint image;
    a feature extraction and analysis unit configured to analyze image features within each of a predetermined number of local segments of the enhanced digital fingerprint image to translate the image features into orientations that estimate dominant structures in the underlying enhanced digital fingerprint image;
    a major block segmentation unit configured to determine, for each of a predetermined number of major blocks in the enhanced digital fingerprint image, a dominant orientation of ridge and valley patterns in the enhanced digital fingerprint image, wherein each major block comprises multiple local segments;
    a feature orientation calculation and extraction unit configured to generate an Orientation Feature Vector by listing, according to a pre-determined sequence, the dominant orientations of each of the major blocks of the enhanced digital fingerprint image;
    at least one memory storing a bank of regular expressions corresponding to a class of fingerprint images, wherein each regular expression describes sequences of dominant orientations associated with previous Orientation Feature Vectors generated from digital fingerprint images belonging to the class of fingerprint images; and
    a regular expression matching unit configured to determine whether the digital fingerprint image belongs to the class of fingerprint images by determining whether any of the regular expressions in the bank of regular expressions match the Orientation Feature Vector generated by the feature orientation calculation and extraction unit.

2. The system according to claim 1, wherein the image enhancement unit further includes an image filter subunit configured to apply a digital filter to the digital fingerprint image to decrease noise in the digital fingerprint image.

3. The system according to claim 2, wherein the image enhancement unit further includes a segmentation subunit configured to segment the digital fingerprint image into multiple equally sized regions, and an image normalization subunit for increasing contrast of ridge/valley pixel intensities within each equally sized region.

4. The system according to claim 3, wherein the image enhancement unit further includes a binary image extracting subunit configured to extract a binary image from the digital fingerprint image by classifying pixels of the digital fingerprint image as ridge pixels or valley pixels.

5. The system according to claim 4, wherein the image enhancement unit further includes an erosion subunit configured to convolve a structure element with the digital fingerprint image.

6. The system according to claim 5, wherein the image enhancement unit further includes a gradient field subunit configured to generate gradient vectors based on directions of underlying features in the digital fingerprint image.

7. The system according to claim 1, wherein the system further comprises a training management unit configured to:
    receive a training digital fingerprint image that belongs to the class of fingerprint images;
    generate a training Orientation Feature Vector from the training digital fingerprint image;
    determine a regular expression in the bank of regular expressions that matches with the training Orientation Feature Vector; and
    promote the matching regular expression to a higher priority in the bank of regular expressions.

8. The system according to claim 1, wherein the class of fingerprint images is one of a left loop class of fingerprint images, a right loop class of fingerprint images, a whorl loop class of fingerprint images, and an arch loop class of fingerprint images.

9. A method for classifying dominant singularity in a digital fingerprint image, the method compromising the steps of:
    (a) enhancing the digital fingerprint image to generate an enhanced digital fingerprint image;
    (b) analyzing image features within each of a predetermined number of local segments of the enhanced digital fingerprint image to translate the image features into orientations that estimate dominant structures in the underlying enhanced digital fingerprint image;
    (c) determining, for each of a predetermined number of major blocks in the enhanced digital fingerprint image, a dominant orientation of ridge and valley patterns in the enhanced digital fingerprint image, wherein each major block comprises multiple local segments;
    (d) generating an Orientation Feature Vector by listing, according to a pre-determined sequence, the dominant orientations of each of the major blocks of the enhanced digital fingerprint image;
    (e) providing a bank of regular expressions corresponding to a class of fingerprint images, wherein each regular expression describes sequences of dominant orientations associated with Orientation Feature Vectors generated from digital fingerprint images belonging to the class of fingerprint images; and (f) determining whether the digital fingerprint image belongs to the class of fingerprint images by determining whether any of the regular expressions in the bank of regular expressions match the Orientation Feature Vector generated in step (d).

10. The method according to claim 9, wherein step (a) further comprises applying a digital filter to the digital fingerprint image to decrease noise in the digital fingerprint image.

11. The method according to claim 10, wherein step (a) further comprises segmenting the digital fingerprint image into multiple equally sized regions, and increasing contrast of ridge/valley pixel intensities within each equally sized region.

12. The method according to claim 11, wherein step (a) further comprises extracting a binary image from the digital fingerprint image by classifying pixels of the digital fingerprint image as ridge pixels or valley pixels.

13. The method according to claim 12, wherein step (a) further comprises convolving a structure element with the digital fingerprint image.

14. The method according to claim 13, wherein step (a) further comprises generating gradient vectors based on directions of underlying features in the digital fingerprint image.

15. The method according to claim 9, wherein the method further includes:
receiving a training digital fingerprint image that belongs to the class of fingerprint images;
generating a training Orientation Feature Vector from the training digital fingerprint image;
determining a regular expression in the bank of regular expressions that matches with the training Orientation Feature Vector; and
promoting the matching regular expression to a higher priority in the bank of regular expressions.

16. The method according to claim 9, wherein the class of fingerprint images is one of a left loop class of fingerprint images, a right loop class of fingerprint images, a whorl loop class of fingerprint images, and an arch loop class of fingerprint images.

17. A system for classifying dominant singularity in a digital fingerprint image, the system comprising:
at least one memory storing instructions and a bank of regular expressions corresponding to a class of fingerprint images, wherein each regular expression describes sequences of dominant orientations associated with previous Orientation Feature Vectors generated from digital fingerprint images belonging to the class of fingerprint images; and
a processor configured to execute the instructions in order to:
enhance the digital fingerprint image to generate an enhanced digital fingerprint image;
analyze image features within each of a predetermined number of local segments of the enhanced digital fingerprint image to translate the image features into orientations that estimate dominant structures in the underlying enhanced digital fingerprint image;
determine, for each of a predetermined number of major blocks in the enhanced digital fingerprint image, a dominant orientation of ridge and valley patterns in the enhanced digital fingerprint image, wherein each major block comprises multiple local segments;
generate an Orientation Feature Vector by listing, according to a pre-determined sequence, the dominant orientations of each of the major blocks of the enhanced digital fingerprint image; and
determine whether the digital fingerprint image belongs to the class of fingerprint images by determining whether any of the regular expressions in the bank of regular expressions match the Orientation Feature Vector generated from the enhanced digital fingerprint image.

* * * * *